Nov. 28, 1950     H. L. CROSE     2,531,934
SIDE DELIVERY RAKE MOUNTING
Filed Oct. 5, 1945     3 Sheets-Sheet 2
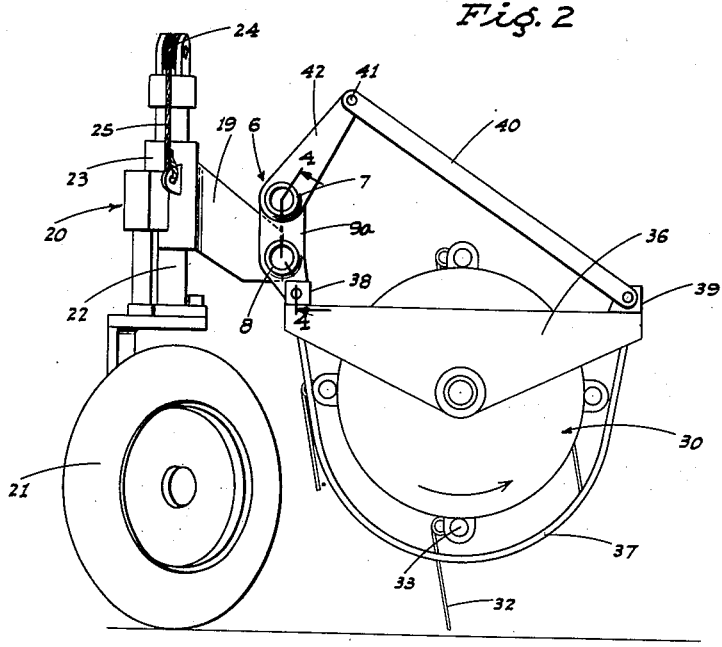
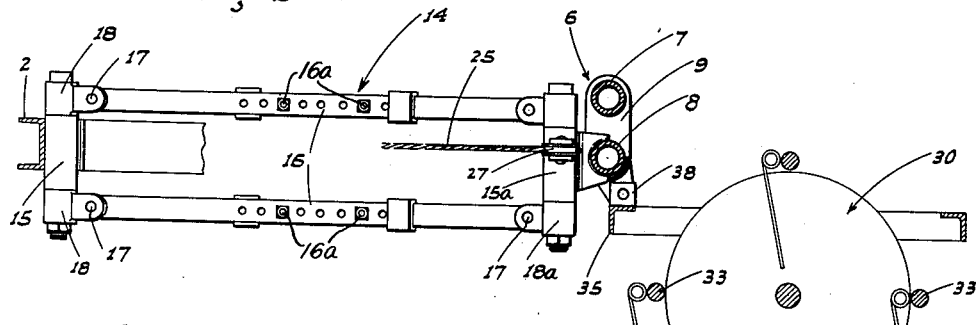
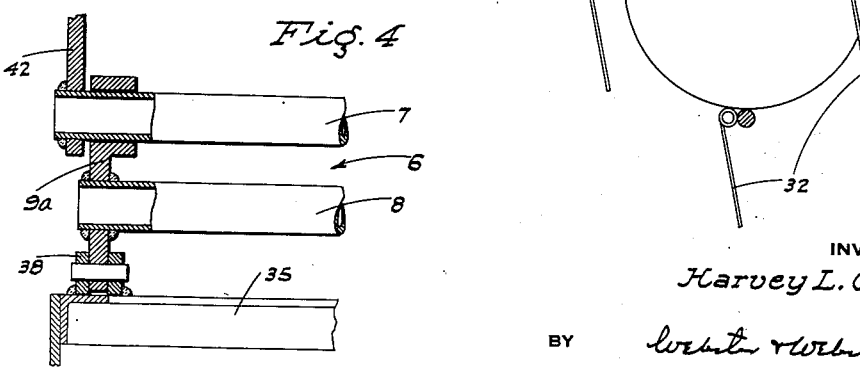
INVENTOR
Harvey L. Crose
BY
ATTORNEYS

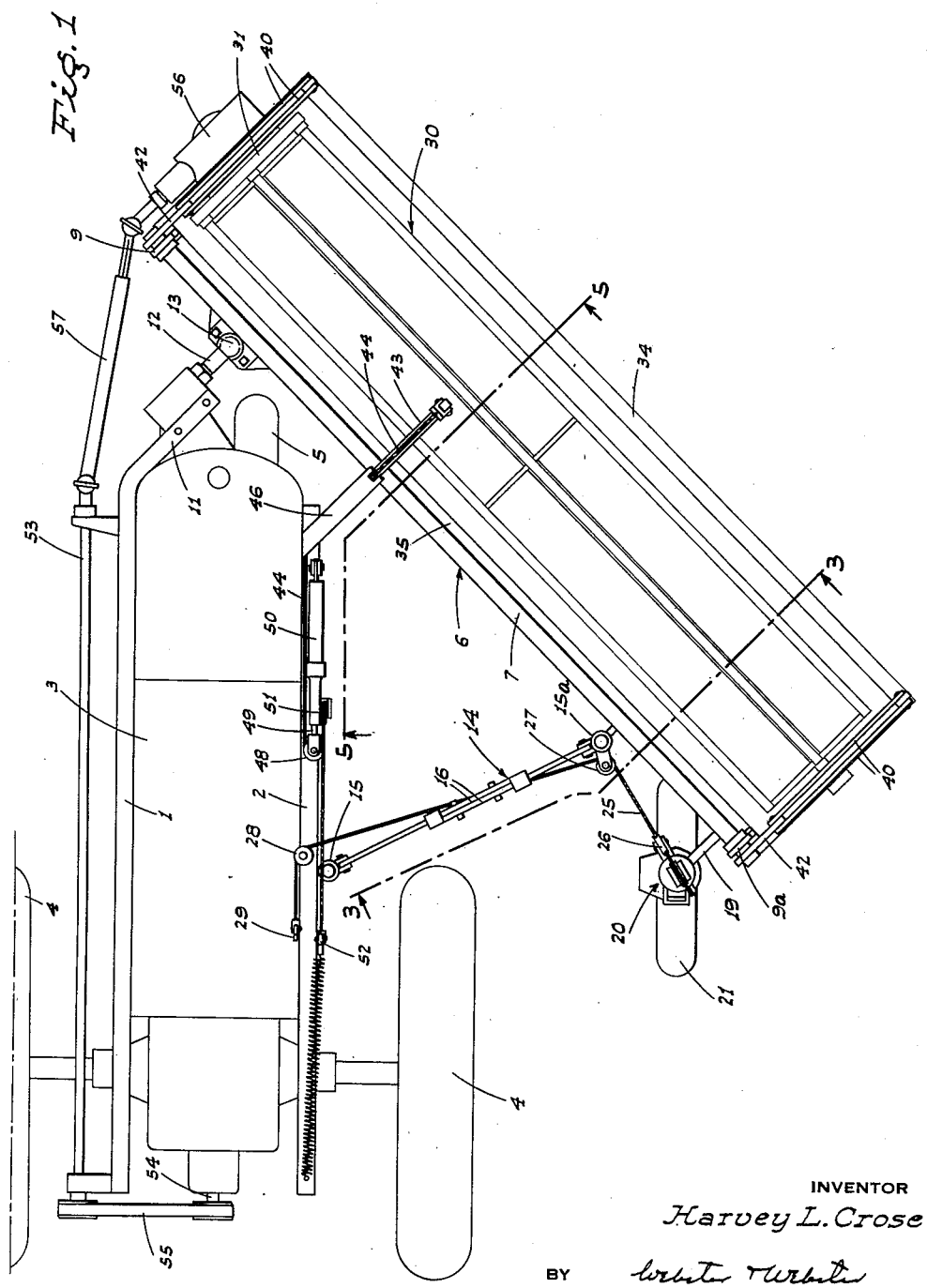

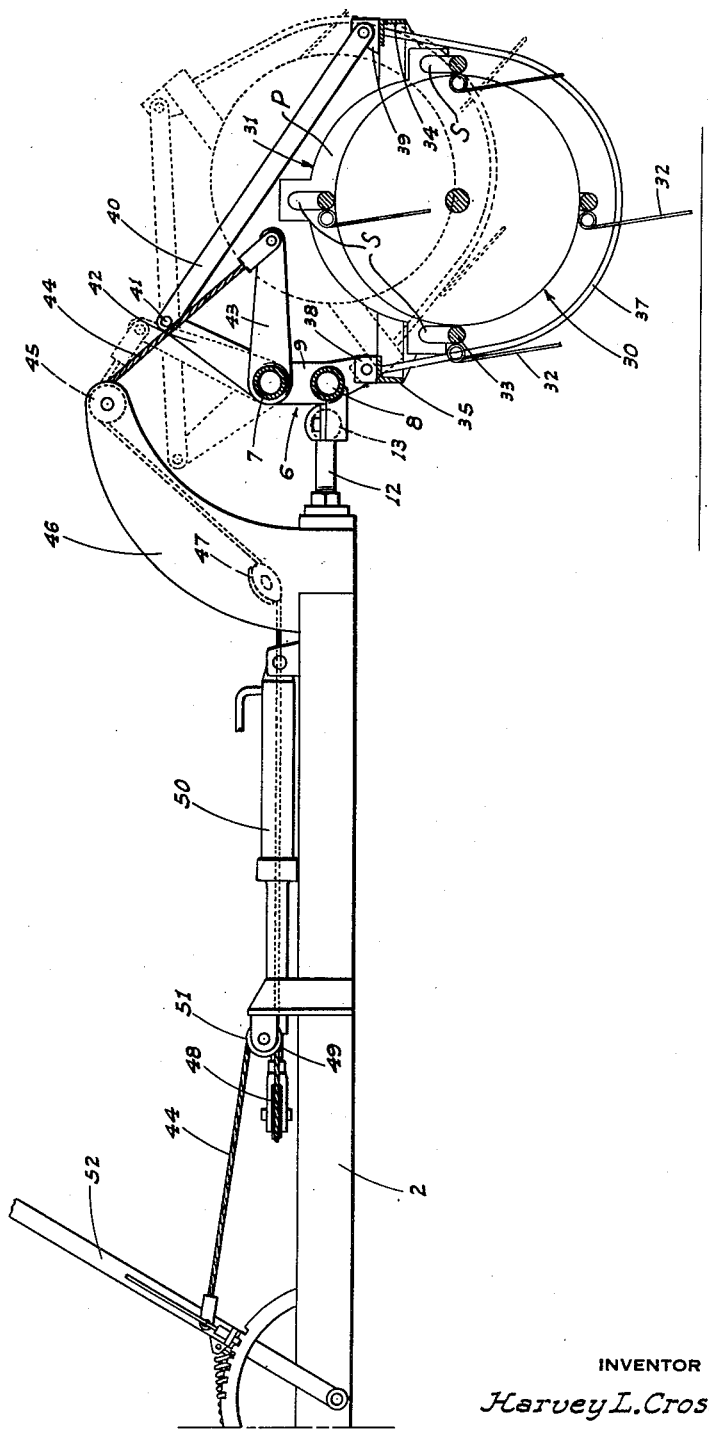

Patented Nov. 28, 1950

2,531,934

UNITED STATES PATENT OFFICE 2,531,934

SIDE DELIVERY RAKE MOUNTING

Harvey L. Crose, Tulare, Calif.

Application October 5, 1945, Serial No. 620,428

4 Claims. (Cl. 56—27)

This invention relates to, and it is an object to provide, a novel adjustable mount for securing a side delivery rake on a tractor in advance of the latter.

Another object of the invention is to provide a mount arranged so that the side delivery rake may be adjusted to level the same transversely of the direction of travel; adjusted in working position above the ground; or elevated bodily to a non-working position for turns or transport from place to place.

A further object of the invention is to provide a side delivery rake mount which includes a unique mounting frame supported adjacent one end from the tractor by a universal connection, and supported adjacent the other end from the ground by a relatively vertically adjustable wheel; there being a vertically swingable parallel linkage unit connected between the tractor and said frame intermediate the ends of the latter whereby to maintain the normal diagonal relationship of the frame to the tractor, regardless of the adjusted vertical position of said frame.

Another object of the invention is to provide novel means pivotally suspending the side delivery rake from the mounting frame for swinging movement between a lowered working position and an elevated position for turns or transport; there being an operator controlled, power actuated arrangement to effect such movement of the side delivery rake.

An additional object is to provide a side delivery rake mounting, as in the preceding paragraph, in which the power actuated arrangement includes a lift cable secured at one end to the rake, a cable guiding reach arm on the tractor and overhanging the rake, and a power cylinder on the tractor connected to the cable.

It is also an object of the invention to mount the side delivery rake in an advanced position where it can be readily seen by the operator, facilitating proper operation and control of the implement.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a plan view of a side delivery rake, front mounted in connection with a tractor by means of the present invention; the reel of said rake being shown diagrammatically.

Figure 2 is an enlarged outer end view of the mount as supporting a side delivery rake.

Figure 3 is an enlarged fragmentary cross section on line 3—3 of Fig. 1.

Figure 4 is an enlarged fragmentary sectional elevation on line 4—4 of Fig. 2.

Figure 5 is an enlarged fragmentary cross section on line 5—5 of Fig. 1.

Referring now more particularly to the characters of reference on the drawings, the side delivery rake mount comprises a pair of transversely spaced, longitudinally extending side beams 1 and 2 included on opposite sides of a tractor 3; the tractor here being shown as of the type which includes a pair of transversely spaced rear wheels 4, and a single tiller wheel 5 at the front.

A substantially horizontal mounting frame, indicated generally at 6, extends diagonally from in front of the tractor in a rearward and laterally outward direction; said mounting frame 6 including an upper tubular cross beam 7 and a lower tubular cross beam 8 disposed in spaced parallel relation. Upstanding end brackets 9 and 9a are secured on and upstand from the lower cross beam 8; the upper cross beam 7 being supported by and turnably projecting through said brackets.

Adjacent its inner and forward end the mounting frame 6 is secured to the front end of the tractor as follows:

At its forward end the side beam 1 includes a laterally inwardly extending, forwardly diagonaled extension 11 having a thrust arm 12 projecting therefrom toward the mounting frame 6 at substantially right angles thereto; said thrust arm 12 being coupled by a ball and socket unit 13 to the lower tubular cross beam 8 adjacent its forward end.

A vertically movable parallel linkage unit, indicated generally at 14, is connected between the side beam 2, intermediate the ends of the tractor, and the mounting frame 6 adjacent its outer end, by means of brackets 15 and 15a, respectively. The links 16 of the unit 14 are vertically pivotally connected, as at 17, to collars 18 and 18a which turn about vertical axes included in the brackets 15 and 15a, respectively. By reason of the parallel linkage unit 14, as above described, the mounting frame 6 can be vertically adjusted at its outer end relative to the ground in the manner as will hereinafter appear. Links 16 are each formed as a pair of overlapping relatively slidable sections, adjustably connected and normally held rigid by bolts 16a, as clearly shown in Fig. 3, so that their effective length may be altered and thus the diagonal relationship of the mounting frame 6 may be varied relative to the direction of travel.

At its outer end the mounting frame 6 is provided with a rearwardly extending rigid arm 19 affixed to the lower tubular cross beam 8; said rigid arm 19 supporting a wheel mount, indicated generally at 20, for a single ground engaging supporting wheel 21. The wheel mount 20 includes an upstanding post 22 vertically slidable through a sleeve 23. At the upper end the post 22 is fitted with a horizotal axis pulley 24. A cable 25 is anchored to one side of the sleeve 23, extends upwardly over the pulley 24, and thence runs downwardly about another pulley 26 on the opposite side of the sleeve 23. From the pulley 26 the cable 25 extends about direction-changing pulleys 27 and 28 on the foremost bracket 15 and side beam 2, respectively. From the pulley 28 the cable 25 extends rearwardly to adjacent the operator's seat and is there connected to an adjustable lever 29.

Upon adjustment of the lever 29 in one direction or the other, the cable 25 is actuated to cause the post 22 to rise or fall in the sleeve 23, resulting in lowering or raising of the outer end of the mounting frame 6. As the side delivery rake is supported from the mounting frame 6 in the manner hereinafter described, a corresponding adjustment of such rake is accomplished.

The side delivery rake is of a type which includes a reel, indicated generally at 30, and which includes as is common, an eccentric control mechanism 31 to regulate the pitch of the tines 32 which depend from the circumferentially spaced, longitudinal supporting rods 33 of said reel; said tine rods projecting through elongated vertical slots S in the end plate P of said mechanism. The reel 30 is rotatably supported in a reel frame which includes a front beam 34 and a rear beam 35; said front and rear beams being connected at the ends by end plates 36. A plurality of spaced guard loops 37 depend from the reel frame below the reel and between which guard loops the tines 32 project at the bottom for crop engagement.

The rear beam 35 of the reel frame is pivotally connected by ears 38 to the lower ends of the brackets 9, and 9a for forward and upward swinging movement of said reel frame.

Adjacent opposite ends of the front beam 34 there are upstanding ears 39 to which rearwardly and upwardly inclined links 40 are pivotally connected. At their upper ends the links 40 are pivotally connected, as at 41, to the upper ends of rigid upstanding levers 42 affixed to opposite end portions of the rotatable upper cross beam 7.

Intermediate the levers 42 the rotatable cross beam 7 is fixed with a normally forwardly projecting operating lever 43, and a cable 44 leads from the forward end of lever 43 upwardly over a direction-changing pulley 45 on the upper end of an upwardly and forwardly inclined reach arm 46 formed on the forward end of the side beam 2 in overhanging relation to the mounting frame 6. From the pulley 45 the cable 44 extends downwardly about a direction changing pulley 47 on the lower end of the reach arm 46, and thence extends rearwardly about a pulley 48 secured on the outer end of a rearwardly projecting piston rod 49 of a fluid pressure actuated power cylinder 50 secured to and extending along the side beam 2.

From the pulley 48 the cable 44 extends forwardly again about another direction changing pulley 51 and then passes rearwardly to an upstanding, adjustable lever 52 disposed within reach of the tractor operator.

The reel 30 is driven from the tractor by the following arrangement:

A longitudinally extending drive shaft 53 extends alongside the side beam 1 of the tractor for substantially the full length thereof; said drive 53 being driven at the rear from the power take off shaft 54 of the tractor by means of a pulley and belt drive unit 55. At the inner end the rake is fitted with an end gear box 56 adapted to drive the reel 30, and a combination universal and spline connection unit 57 connects between the forward end of the drive shaft 53 and a gear box 56, whereby to properly drive the reel in any position of vertical adjustment of the implement.

When the implement is in use the piston rod 49 is normally retracted, and the operator adjusts the lever 52 so as to swing the lever 43 to a position which disposes the reel of the side delivery rake a proper distance above ground for efficient operation; such adjustment of the reel being accomplished through the medium of the upstanding levers 42 and links 40.

For making turns, or for transport from place to place, the entire side delivery rake is swung forwardly and upwardly to a substantial height by actuation of the power cylinder 50; an elevated position of the rake being shown in dotted lines in Fig. 5. The power cylinder 50 is valve-controlled by the operator by means of a fluid pressure conduit system (not shown).

An advantage of the control arrangement, as described above, is that when the power cylinder 50 is released to return to its normal retracted position, the reel 30 assumes its previously set working position, as the power cylinder 50 merely acts to vary the effective length of the cable 44 without actually changing its position of adjustment by the lever 52.

With a side delivery rake mounting, as described herein, the rake is disposed entirely ahead of the operator, where it is readily visible, which expedites proper and efficient operation and control of the implement.

Additionally, as the levers 29 and 52 are adjacent the operator, he can level the implement or adjust it vertically, respectively, while the tractor is in motion. In this manner the implement can be maintained at all times in the best position for maximum efficency, i. e. so that the reel sweeps or picks up the crop cleanly and delivers it laterally of the outer end of the implement into a compact windrow.

From the foregoing description it will be readily seen that such a device has been produced as substantially fulfills the objects of the invention as set forth herein.

While this specification sets forth in detail the present and preferred construction of the device, still in practice such deviations from such detail may be resorted to as do not form a departure from the spirit of the invention as described by the appended claims.

Having thus described the invention, what is claimed as new and useful and upon which Letters Patent are desired is:

1. In combination with a tractor, a side delivery rake mounting therefor, comprising an elongated rearwardly diagonally extending frame, means interconnecting the front of the tractor and the frame adjacent the forward end of the latter, means interconnecting the tractor and the frame adjacent the rearward end of the latter, a turnable cross beam extending longitudinally of the frame, a rotary side delivery rake pivotally mounted on said frame in advance of said cross beam, spaced levers upstanding from said turnable cross beam, links pivotally connected between said levers and the front portion of the rake, and operator controlled means operatively connected to said cross beam to regulate the rotative position of the rake.

2. In combination with a tractor, a side delivery rake mounting therefor, comprising an elongated rearwardly diagonally extending frame, means pivotally interconnecting the front of the tractor and the frame adjacent the forward end of the latter for vertical adjustment of said frame about the pivot, vertically swingable link means interconnecting the tractor and the frame adjacent the rearward end of the latter, a wheel unit adjacent the rearward end of the frame, means connecting the frame to the wheel unit in vertically adjustable relation, a turnable cross beam extending longitudinally of the frame, a rotary side delivery rake pivotally mounted on said frame in advance of said cross beam, spaced levers upstanding from said turnable cross beam, links pivotally connected between said levers and the front portion of the rake, and operator controlled means operatively connected to said cross beam to regulate the rotative position of the rake.

3. In combination with a tractor, a side delivery rake mounting therefor, comprising an elongated rearwardly diagonally extending frame, a universal connection coupling the front of the tractor and the frame adjacent the forward end of the latter for selective vertical or horizontal adjustment of said frame about said connection as an axis, vertically and horizontally swingable longitudinally adjustable link means interconnecting the tractor and the frame adjacent the rearward end of the latter, a wheel unit adjacent the rearward end of the frame, means connecting the frame to the wheel unit in vertically adjustable relation, a turnable cross beam extending longitudinally of the frame, a rotary side delivery rake pivotally mounted on said frame in advance of said cross beam, spaced levers upstanding from said turnable cross beam, links pivotally connected between said levers and the front portion of the rake, and operator controlled means operatively connected to said cross beam to regulate the rotative position of the rake.

4. A combination, as in claim 3, in which said link means comprises upper and lower links in parallel relation, said links each being longitudinally adjustable, and double axis pivotal connections at the ends of the links securing the same to the tractor and frame, respectively; each such connection including a vertical axis and a horizontal axis.

HARVEY L. CROSE.

REFERENCES CITED

The following references are of record in the file of this patent:

UNITED STATES PATENTS

| Number | Name | Date |
| --- | --- | --- |
| 471,648 | Mann | Mar. 29, 1892 |
| 762,585 | Holley | June 14, 1904 |
| 946,883 | Smith | Jan. 18, 1910 |
| 1,239,153 | Bamford et al. | Sept. 4, 1917 |
| 1,728,301 | Murphy et al. | Sept. 17, 1929 |
| 2,028,332 | Johnson | Jan. 21, 1936 |
| 2,156,570 | Lindgren | May 2, 1939 |
| 2,238,840 | Weishaar | Apr. 15, 1941 |
| 2,296,065 | Slamp | Sept. 15, 1942 |
| 2,310,387 | Blair et al. | Feb. 9, 1943 |
| 2,370,355 | Jones | Feb. 27, 1945 |
| 2,436,475 | Jones et al. | Feb. 24, 1948 |